(12) United States Patent
Chen et al.

(10) Patent No.: US 7,142,103 B2
(45) Date of Patent: Nov. 28, 2006

(54) MOBILE SIGNAL LIGHT SET

(75) Inventors: Chang-Hao Chen, 4/F., No. 2, Hsinpu 7th St., Hsinpu Tsun, Taoyuan City (TW); Wu-Chun Hsu, No. 228, Chungcheng Rd., Chungho Li, Taoyuan City (TW)

(73) Assignees: Chang-Hao Chen, Taoyuan City (TW); Wu-Chun Hsu, Taoyuan City (TW); Bihari Lund, Edison, NJ (US)

( * ) Notice: Subject to any disclaimer, the term of this patent is extended or adjusted under 35 U.S.C. 154(b) by 214 days.

(21) Appl. No.: 10/978,421

(22) Filed: Nov. 2, 2004

(65) Prior Publication Data

US 2006/0103543 A1 May 18, 2006

(51) Int. Cl.
*B60Q 1/52* (2006.01)

(52) U.S. Cl. .................. 340/471; 340/473; 340/815.4; 340/815.45; 340/908; 340/321

(58) Field of Classification Search ............... 340/471, 340/473, 321, 815.4, 815.45, 908; 362/103, 362/104, 190, 191; 116/63 T, 63 C; 40/593, 40/903

See application file for complete search history.

(56) References Cited

U.S. PATENT DOCUMENTS

| | | | | |
|---|---|---|---|---|
| 4,952,910 A | * | 8/1990 | Straten et al. | 340/473 |
| 5,126,926 A | * | 6/1992 | Chiang Wen | 362/541 |
| 5,606,309 A | * | 2/1997 | Smith | 340/473 |
| 6,389,720 B1 | * | 5/2002 | Hsieh | 40/593 |
| 6,535,117 B1 | * | 3/2003 | Haerer | 340/473 |

* cited by examiner

*Primary Examiner*—Hung Nguyen
(74) *Attorney, Agent, or Firm*—Rosenberg, Klein & Lee

(57) ABSTRACT

A mobile signal light set is disclosed to include three warning signal bars collapsibly arranged on a base to form a light-emitting warning triangle, which base holding a dry battery and a rechargeable battery on the inside, a lamp bulb at one end, a battery charging/discharging control switch, a warning signal bar on/off switch for controlling on/off status of the LEDs of the warning signal bars, a lamp bulb on/off switch for controlling on/off status of the lamp bulb, a cable with AC adapter connector for converting city power supply into AC power supply for charging the rechargeable battery, a cable with car DC connector connectable to the socket for cigarette lighter of a car for charging the battery of the car with the battery power supply of the rechargeable battery or charging the rechargeable battery with the battery of the car subject to the control of the battery charging/discharging control switch.

4 Claims, 7 Drawing Sheets

MOBILE SIGNAL LIGHT SET

BACKGROUND OF THE INVENTION

1. Field of the Invention

The present invention relates to a signal light and more particularly, to a mobile signal light set that can be used as a warning triangle to give a warning signal when the car failed as well as a portable electric light for illumination.

2. Description of the Related Art

Conventional lighting fixtures are numerous. However, these lighting fixtures are used for illumination, not for other purposes, for example, not usable for giving a warning signal when the car failed. Further, regular mobile warning triangles include two types, namely, the reflective warning triangles and the light emitting warning triangles. A light emitting warning triangle uses battery to provide the necessary working voltage to lamp bulbs or light emitting diodes in the triangle. A light emitting warning triangle can only be used as signal means. It cannot be used for other purposes, for example, portable electric light.

SUMMARY OF THE INVENTION

The present invention has been accomplished under the circumstances in view. It is the main object of the present invention to provide a mobile signal light set, which can be used as a warning triangle as well as a portable electric light. To achieve this and other objects of the present invention, the mobile signal light set comprises a first warning signal bar, a second warning signal bar, a third warning signal bar, and a base. The first, second and third warning signal bars each have installed therein a plurality of LEDs (light emitting diodes), and are installed in the base and settable between an operative position where the first, second and third warning signal bars form a warning triangle and a received position where the first, second and third warning signal bars are closely attached to one another. The base comprises a dry battery and a rechargeable battery on the inside, a lamp bulb extended out of one end thereof, a battery charging/discharging control switch, a warning signal bar on/off switch for controlling on/off status of the LEDs, a lamp bulb on/off switch for controlling on/off status of the lamp bulb, a cable with AC adapter connector for converting city power supply into AC power supply for charging the rechargeable battery, a cable with car DC connector connectable to the socket for cigarette lighter of a car for charging the battery of the car with the battery power supply of the rechargeable battery or charging the rechargeable battery with the battery of the car subject to the control of the battery charging/discharging control switch.

DETAILED DESCRIPTION OF THE PREFERRED EMBODIMENT

Figure 1:
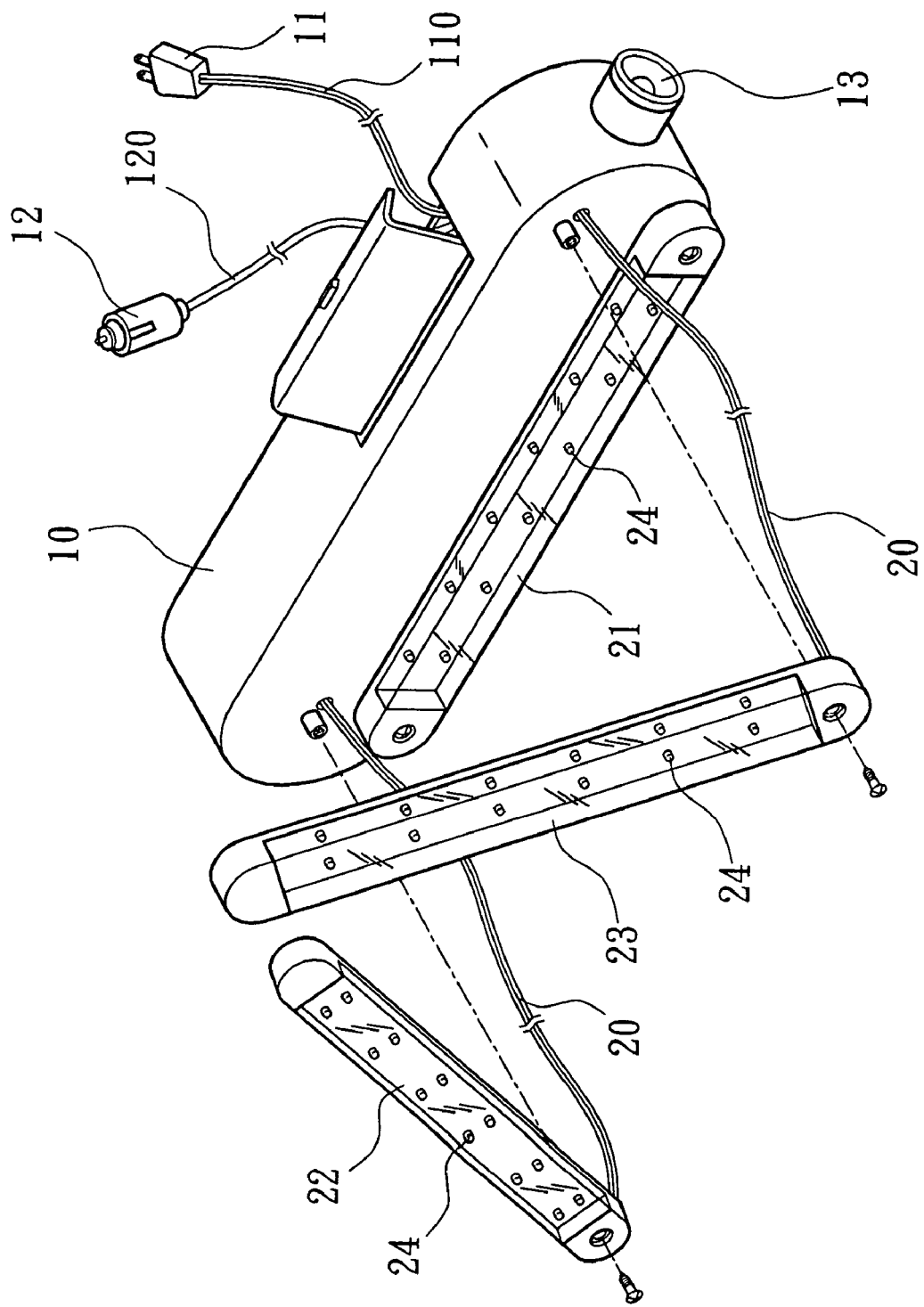
FIG. 1 is an exploded view of a mobile signal light set according to the present invention.
Figure 2:
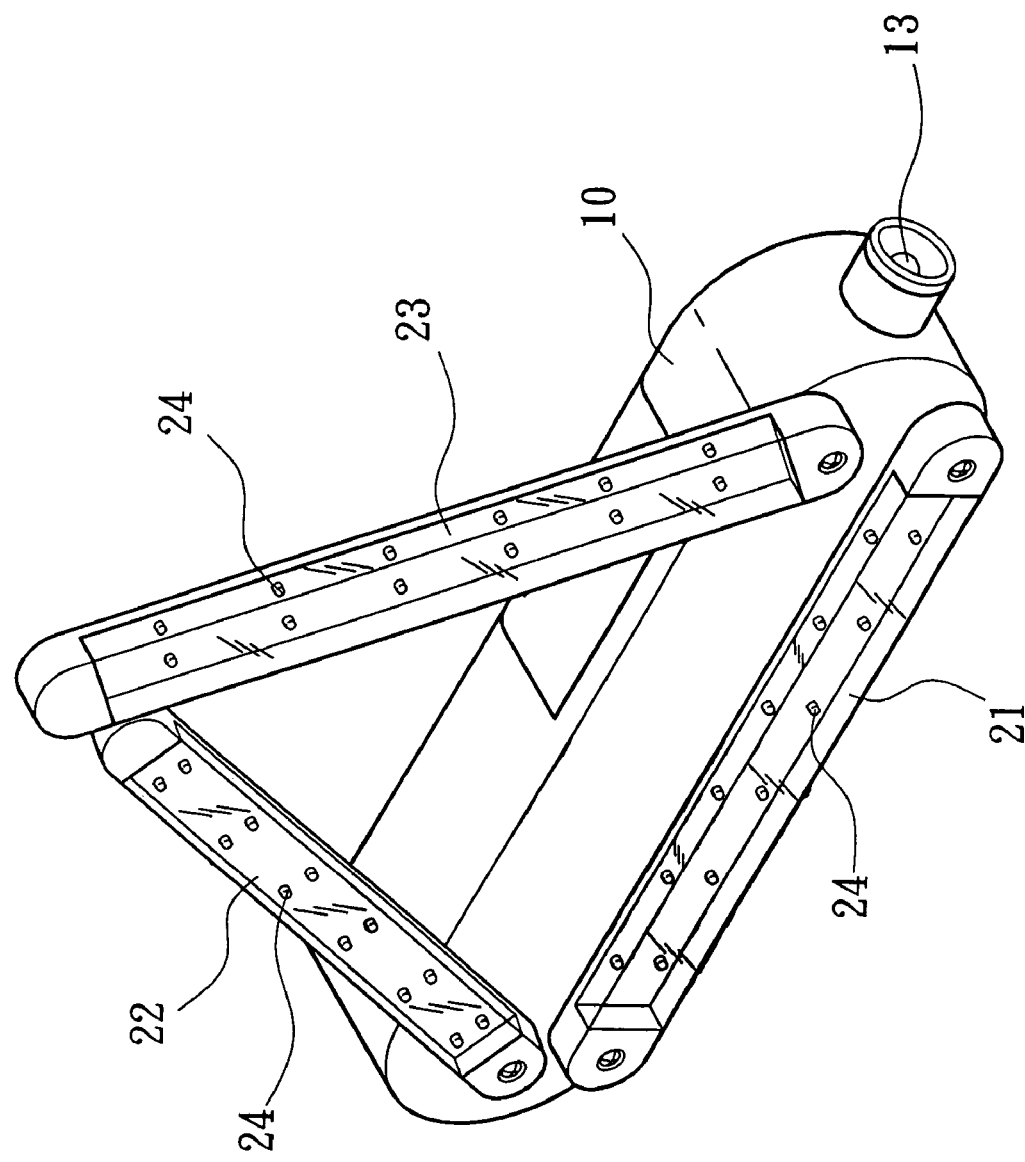
FIG. 2 is a perspective front view of the mobile signal light set according to the present invention.

Referring to FIGS. 1~4, a mobile signal light set comprises three warning signal bars 21~23 and a base 10. The warning signal bars 21~23 each have installed therein a plurality of LEDs (light emitting diodes) 24. One warning signal bar, namely, the first warning signal bar 21 is fixedly fastened to the outside wall of the base 10, and electrically connected to a battery power supply (not shown) inside the base 10. The second warning signal bar 22 and the third warning signal bar 23 each have one end, namely, the bottom end respectively pivoted to the base 10 in such a manner that the second warning signal bar 22 and the third warning signal bar 23 can be turned between the received position where the three warning signal bars 21~23 are closely received together and attached to one above another (see FIG. 4) and the extended position where the three warning signal bars 21~23 form a warning triangle (see FIG. 2). The second warning signal bar 22 and the third warning signal bar 23 each have an electric wire 20 respectively connected to the battery power supply inside the base 10.

The base 10 comprises a dry battery and a rechargeable battery on the inside, a lamp bulb 13 extended out of one end thereof, a battery charging/discharging control switch 14, a warning signal bar on/off switch 15, a lamp bulb on/off switch 16, a cable 110 with AC adapter connector 11 for converting city power supply into AC power supply for charging the rechargeable battery, a cable 120 with car DC connector 12 connectable to the socket for cigarette lighter of a car, a power volume switch 17, and a power indicator light 18. By means of the power volume switch 17, and the power indicator light 18, the mobile signal light set can be used to check the power status of the car battery after connection of the car DC connector 12 to the socket for cigarette lighter of the car. When power low, the battery charging/discharging control switch 14 is switched to OUT position, and the internal rechargeable battery of the base 10 starts charging the battery of the car.

Figure 3:
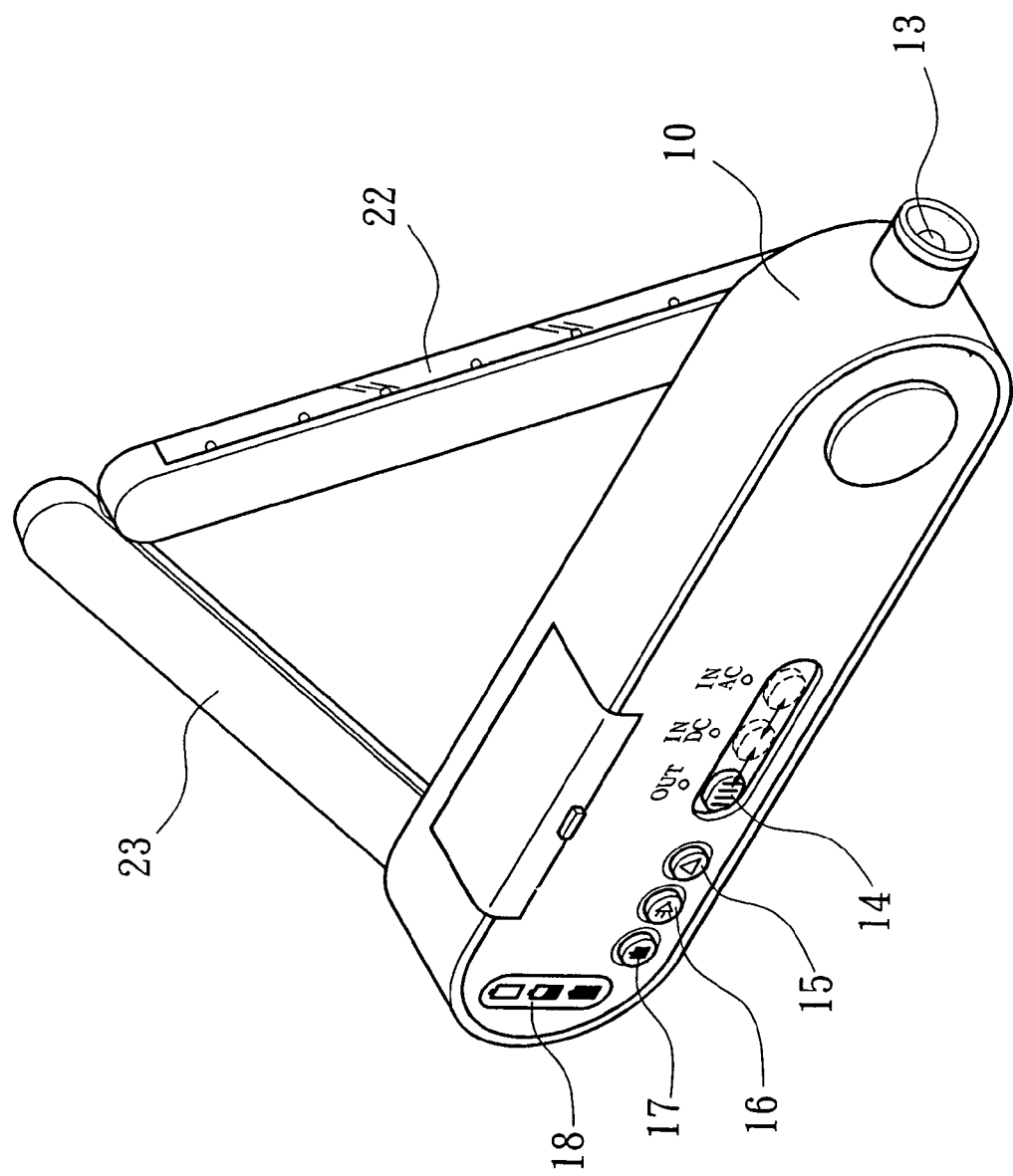
FIG. 3 is an oblique rear side view of FIG. 2.
Figure 4:
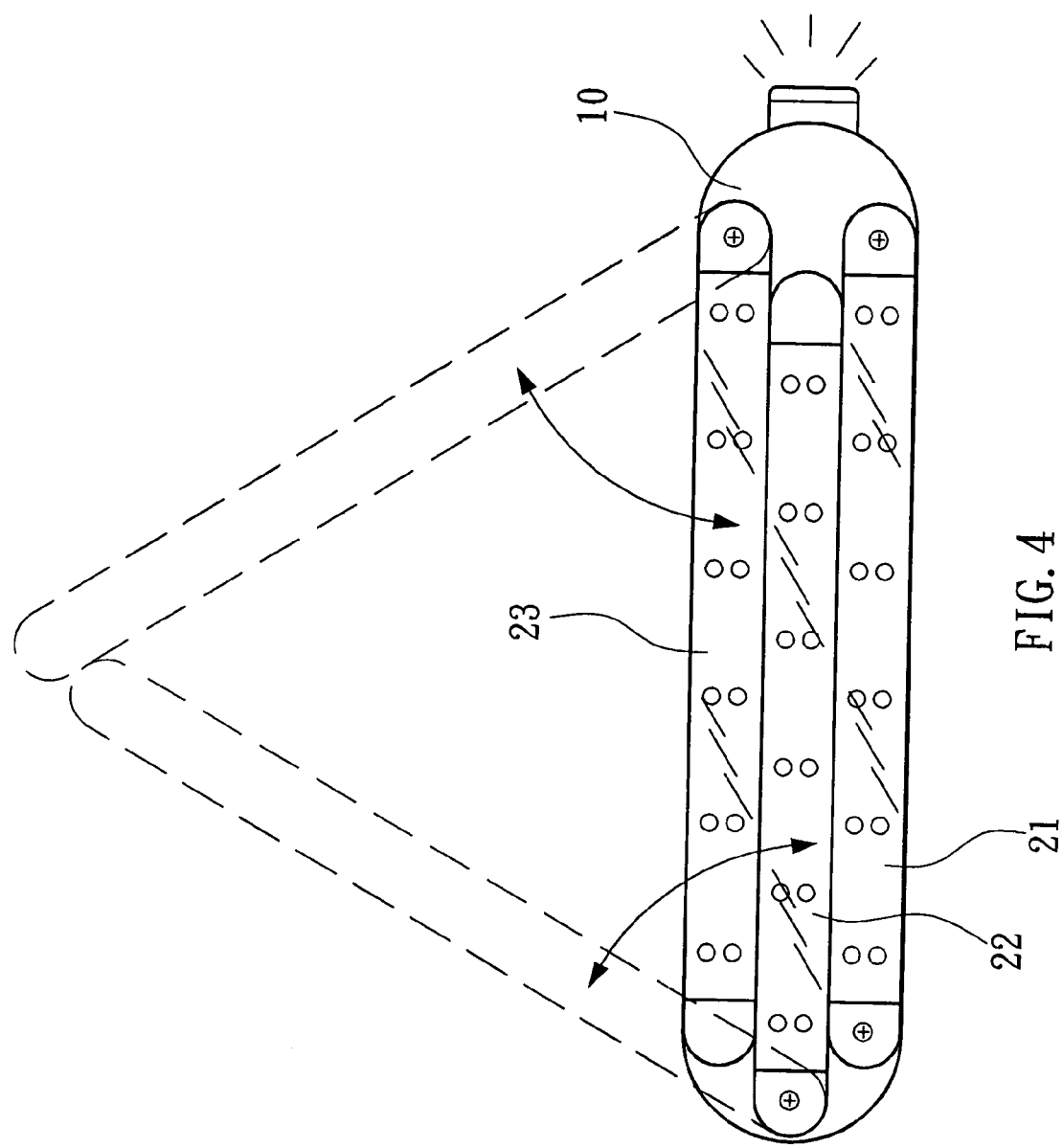
FIG. 4 is a schematic drawing of the present invention, showing the second and third warning signal bars set between the extended position and the received position.

Referring to FIG. 3, the battery charging/discharging control switch 14 can be selectively set in one of three positions. When switched to IN AC position, AC power supply can be used to charge the rechargeable battery. When switched to IN DC position, DC power supply can be used to charge the rechargeable battery. When switched to OUT position, the warning signal light set can be used to charge the battery of a car. The warning signal bar on/off switch 15 controls on/off status of the LEDs 24 of the warning signal bars 21~23. The lamp bulb on/off switch 16 controls on/off status of the lamp bulb 13. The power volume switch 17 is adapted to control testing the power volume of a car. The power indicator light 18 is adapted to indicate the power volume of the car being tested by the power volume switch 17.

The mobile signal light set of the present invention can be used in one of the following ways:

1. Automobile failure warning function, where the second and third warning signal bars 22 and 23 are extended out to have the three warning signal bars 21~23 form a warning triangle (see FIG. 2), and then the battery charging/discharging control switch 14 is switched to OUT position, and then the warning signal bar on/off switch 15 is operated to switch on the LEDs 24 of the warning signal bars 21~23. The LEDs 24 can be red, blue, yellow, or white LEDs, controlled to flash synchronously or in a proper order. When not in use, the second and third warning signal bars 22 and 23 are turned to the received position and closely attached to the first warning signal bar 21.

2. Portable electric light where the second and third warning signal bars 22 and 23 are turned to the received position and closely attached to the first warning signal bar 21 at the base 10 (see FIG. 4), and then the control switch 14 is switched to OUT position, and then the lamp bulb on/off switch 16 is operated to switch on the lamp bulb 13. Thus, the user can hold the base 10 with the hand and use the mobile signal light set as a portable electric light.

3. Battery charging/discharging function where the cable 110 with AC adapter connector 11 can be connected to an AC outlet and then the control switch 14 can be switched to IN AC position to convert city power supply into AC power supply for charging the rechargeable battery; the cable 120 with car DC connector 12 can be connected to the socket for cigarette lighter of a car and then the control switch 14 can be switched to IN DC position to use car 12V DC to charge the rechargeable battery; the cable 120 with car DC connector 12 can be connected to the socket for cigarette lighter of a car and then the control switch 14 can be switched to OUT position to output DC power supply to charge the battery of the car.

4. Car battery volume detection where the cable 120 with car DC connector 12 is connected to the socket for cigarette lighter of a car and then the control switch 14 is switched to OUT position, and then the power volume switch 17 is switched on to detect the power volume of the battery of the car. When the car battery is full, the bottom light of the power indicator light 18 gives off light; when the car battery is not in the saturated status but above battery low, the middle light of the power indicator light 18 gives off light; when the car battery is low, the top light of the power indicator light 18 gives off light, and the cable 120 with car DC connector 12 can be connected to the socket for cigarette lighter of the car to charge the car battery of the car.

Figure 5:
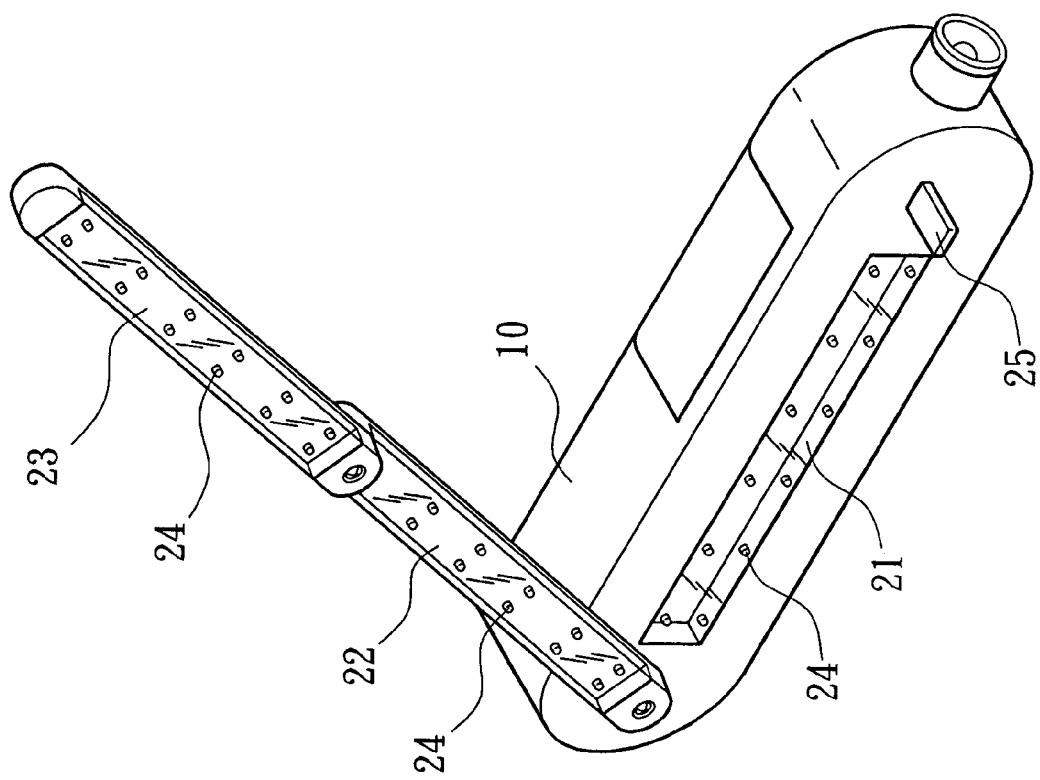
FIG. 5 is a perspective view of an alternate form of the mobile signal light set according to the present invention.
Figure 6:
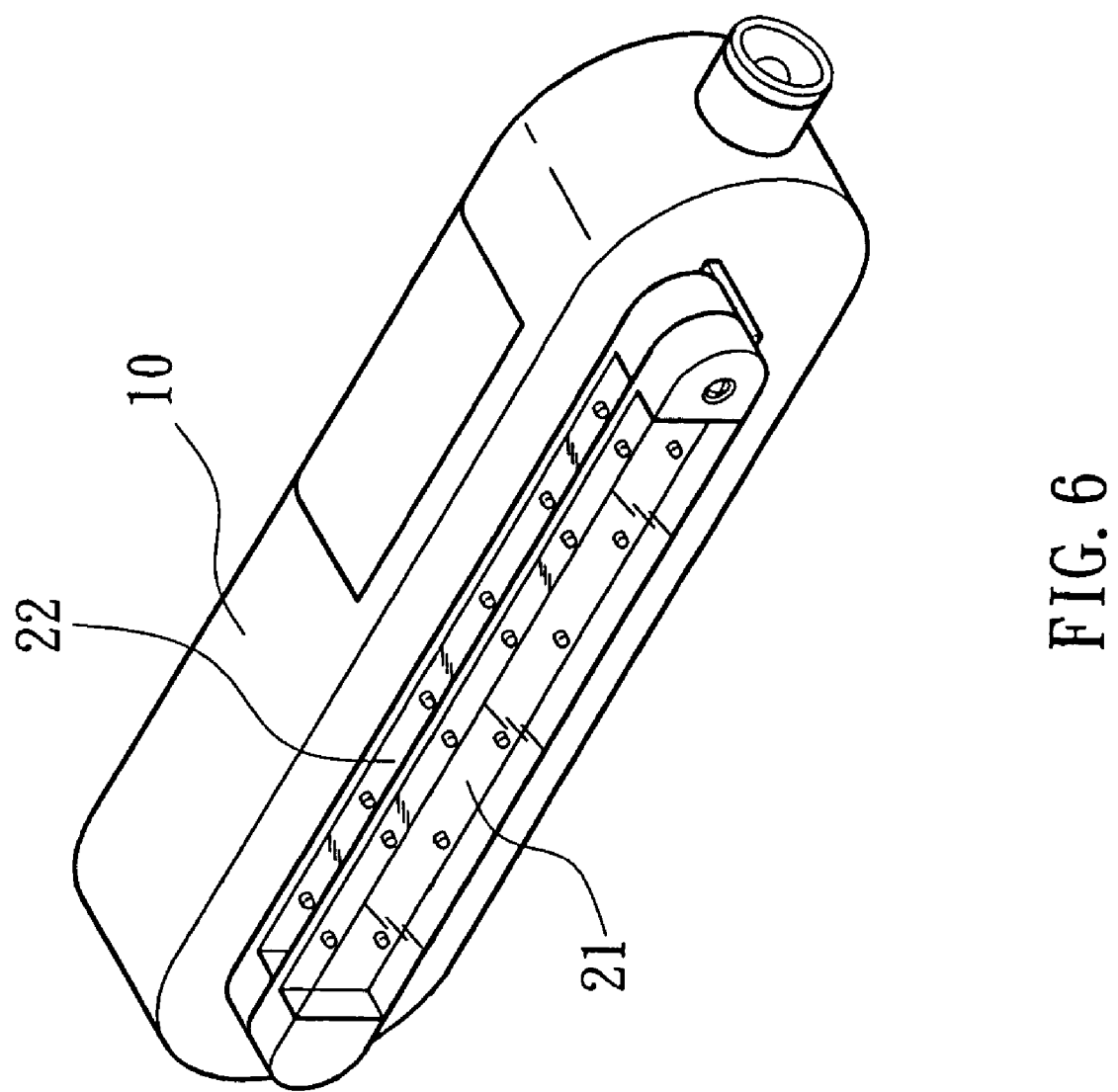
FIG. 6 is similar to FIG. 5 but showing the warning signal bars in the received status.
Figure 7:
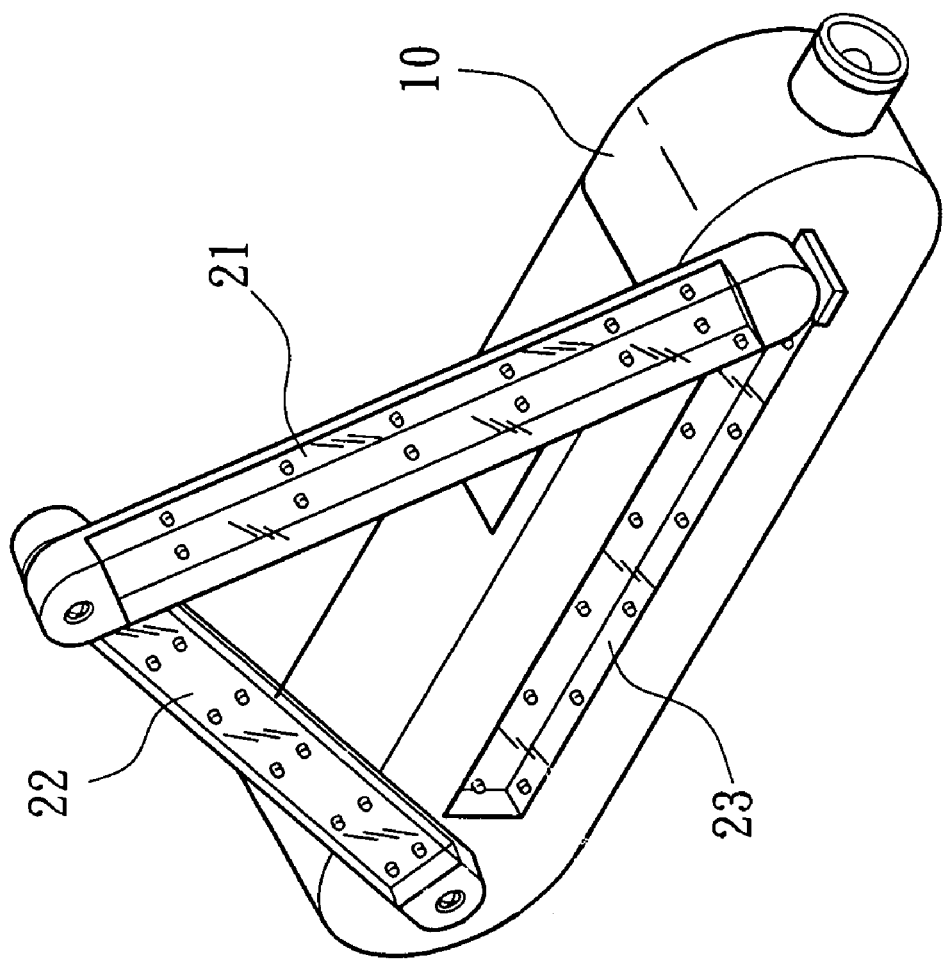
FIG. 7 shows the warning signal bars of the mobile signal light set of FIG. 5 set into a warning triangle.

FIGS. 5~7 show an alternate form of the present invention. According to this embodiment, the first warning signal bar 21 is formed integral with the base 10, the second warning signal bar 22 has one end pivoted to the base adjacent to one end of the first warning signal bar 21 and the other end pivoted to one end of the third warning signal bar 23. The other end (free end) of the third warning signal bar 23 can be rested on a lug 25 at the base 10 when setting the warning signal bars 21~23 into a warning triangle.

A prototype of mobile signal light set has been constructed with the features of FIGS. 1~7. The mobile signal light set functions smoothly to provide all the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A mobile signal light set comprising a first warning signal bar, a second warning signal bar, a third warning signal bar, and a base, wherein:

said first, second and third warning signal bars each have installed therein a plurality of LEDs (light emitting diodes), and are installed in said base and settable between an operative position where said first, second and third warning signal bars form a warning triangle and a received position where said first, second and third warning signal bars are closely attached to one another;

said base comprises a dry battery and a rechargeable battery on the inside, a lamp bulb extended out of one end thereof, a battery charging/discharging control switch, a warning signal bar on/off switch for controlling on/off status of said LEDs, a lamp bulb on/off switch for controlling on/off status of said lamp bulb, a cable with AC adapter connector for converting city power supply into AC power supply for charging said rechargeable battery, a cable with car DC connector connectable to the socket for cigarette lighter of a car for charging the battery of the car with the battery power supply of said rechargeable battery or charging said rechargeable battery with the battery of the car subject to the control of said battery charging/discharging control switch.

2. The mobile signal light set as claimed in claim 1, wherein said base further comprises, a power volume switch for detecting the power volume of the battery of a car after connection of said cable with car DC connector to the socket for cigarette lighter of the car, and a power indicator light for indicating the power volume of the battery of the car under detection.

3. The mobile signal light set as claimed in claim 1, wherein said first warning signal bar is fixedly mounted on said base; said second warning signal bar and said third warning signal bar each have first end respectively pivoted to said base and a second end connectable to each other.

4. The mobile signal light set as claimed in claim 1, wherein said first warning signal bar is formed integral with said base; said second warning signal bar has a first end pivoted to said base adjacent to a first end of said first warning signal bar and a second end pivoted to said third warning signal bar; said third warning signal bar has a first end pivoted to the second end of said second warning signal bar and a second end connectable to a lug at said base adjacent to a second end of said first warning signal bar.

\* \* \* \* \*